United States Patent [19]
Schmitz

[11] 3,744,864

[45] July 10, 1973

[54] INTEGRAL HANDLE AND COVER RELEASE MECHANISM FOR AN ELECTRONIC EQUIPMENT CABINET

[75] Inventor: Raymond J. Schmitz, Prospect Heights, Ill.

[73] Assignee: Motorola, Inc., Franklin Park, Ill.

[22] Filed: Apr. 10, 1972

[21] Appl. No.: 242,560

[52] U.S. Cl. .................. 312/244, 16/115, 312/7 TV

[51] Int. Cl. .................. A47b 95/02

[58] Field of Search .................. 312/7 TV, 7 R, 244; 16/115; 190/55 R, 57, 58 B

[56] References Cited

UNITED STATES PATENTS

| | | | |
|---|---|---|---|
| 1,958,587 | 5/1934 | Mitchell et al. | 16/115 |
| 3,109,687 | 11/1963 | Dereng | 312/244 |
| 3,192,004 | 6/1965 | Whitney | 312/244 |

*Primary Examiner*—James C. Mitchell
*Attorney*—Vincent Rauner, Eugene A. Parsons et al.

[57] ABSTRACT

A retractable carrying handle and cover release mechanism for an electronic equipment cabinet having a latchable access cover in one of the side walls thereof for providing acoess to the equipment controls. A pushbutton, provided within the carrying handle, operates to release the cover when the handle is in a retracted position, but does not allow the cover to be released when the handle is in an extended carrying position.

13 Claims, 4 Drawing Figures

INTEGRAL HANDLE AND COVER RELEASE MECHANISM FOR AN ELECTRONIC EQUIPMENT CABINET

BACKGROUND

1. FIELD OF INVENTION

This invention relates generally to cabinets for electronic equipment, and more particularly, to a combination retractable carrying handle and cover release mechanism for a portable television receiver cabinet having an access cover over a recessed adjustment and control compartment.

2. PRIOR ART

In current designs for portable television receiver cabinets, a handle is generally provided on the top wall of the television cabinet, and control knobs for adjusting the receiver are provided on the front surface of the cabinet. In another design, the control knobs are mounted within a recessed compartment on the top surface of the cabinet, and a hinged cover is employed to provide access to the recessed compartment. A cover release mechanism is generally provided within the top wall of the cabinet to allow the cover to be opened for access to the controls.

Because of the large number of controls required for proper operation of a television set, particularly a color receiver, the cover occupies a relatively large portion of the total area of the top wall of the cabinet. As a result, because of the limited area of the top wall of the cabinet, one edge of the cover must generally be positioned close to the carrying handle, which because of balance considerations must be positioned close to the center of the top wall. This positioning limits the clearance between the cover and the handle, and makes it possible for the cover to strike the hand of the person transporting the cabinet if the cover is inadvertently released, thereby creating a hazardous situation which can cause the transporter to drop the set.

SUMMARY

It is an object of the present invention to provide a release mechanism for a control compartment cover that prevents inadvertent release of the cover when the cabinet is being carried.

It is another object of the invention to provide a control compartment cover release mechanism that covers a minimum amount of cabinet wall area.

It is a further object of this invention to provide a control compartment cover release mechanism within a retractable carrying handle for a portable television receiver which operates to release the cover only when the handle is in its retracted position.

In accordance with a preferred embodiment of the invention, a retractable carrying handle having a pushbutton means mounted therein is movably attached to the top wall of a cabinet for a television receiver or other piece of electronic equipment. A spring biased hinged door, or cover, is provided over a recessed control compartment in the top wall of the cabinet. The cover is retained in a closed position by a spring biased retaining means extending at least partially beneath the carrying handle. The pushbutton means mounted within the handle includes means for engaging the portion of the retaining means beneath the handle when the handle is in its recessed position, thereby allowing the cover to be released when the pushbutton is depressed and the handle is in its retracted position. Lifting the handle to its extended carrying position moves the pushbutton member out of engagement with the releasing means, thereby preventing inadvertent activation of the cover retaining means by the pushbutton member during the transporting of the cabinet.

DETAILED DESCRIPTION

Figure 1:
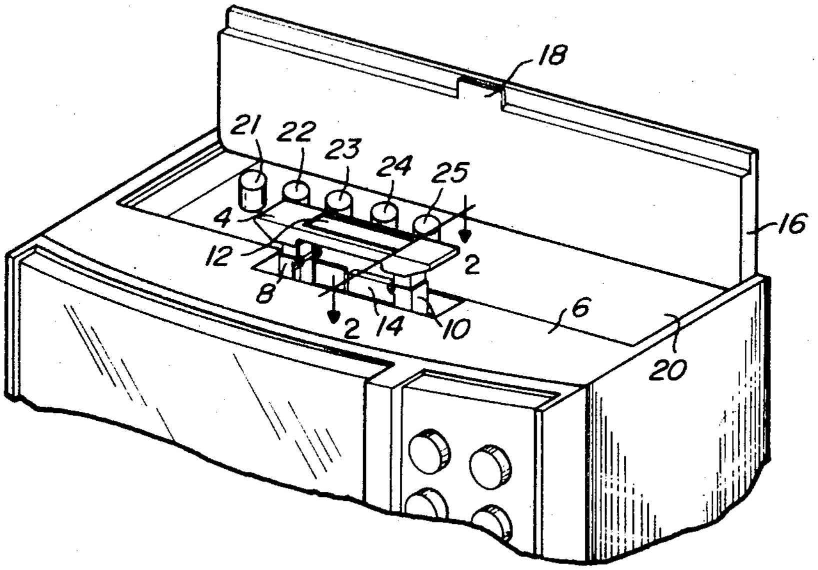
FIG. 1 is a perspective view of the top portion of a television cabinet showing the handle and cover release mechanism, according to the invention, in the extended carrying position, and further showing the control compartment cover in the open position.

Referring to FIG. 1, there is shown an elongated carrying handle member 4 attached to one of the walls, in this embodiment, a top wall 6, of a television receiver by means of extendable leg members 8 and 10. The handle member 4 has a pushbutton member 12, or other actuating means, mounted movably therein for engagement with a cover retaining means which, in this embodiment, includes an L-shaped cover retaining member 14. A hinged cover 16 having a lip portion 18 for engagement by the cover retaining member 14 is positioned over a control compartment 20 which contains control knobs 21 through 25.

Figure 2:
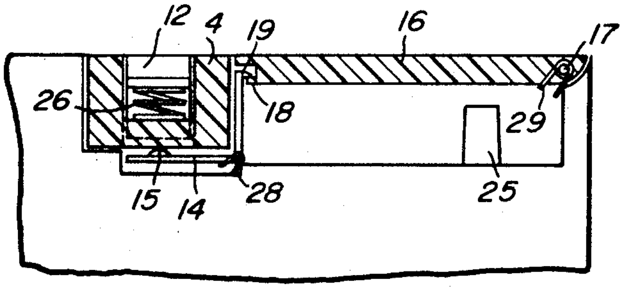
FIG. 2 is a sectional view taken along the line 2—2 of FIG. 1 showing the carrying handle in the retracted position with the pushbutton actuating means positioned for engagement with the cover release mechanism.

Referring to FIG. 2, there is shown a cross-sectional view taken along the line 2—2 of FIG. 1 of the handle member 4 in a retracted position, with the cover 16 being held in a closed position by the retaining member 14. In this embodiment, the cover 16 and handle member 4 are flush with the cabinet wall when the cover is closed and the handle member is retracted, but structures that are not completely flush may be employed and still fall within the scope of the invention. The pushbutton member 12 is slidably mounted within the handle member 4, and a biasing means, in this embodiment, a spring 26, is mounted between a shoulder surface of pushbutton 12 and an interior surface of handle member 4. The retaining means includes an L-shaped member 14 which, in this embodiment, is pivotally mounted to the cabinet about the point of intersection of the two legs of the L. A biasing means, in this embodiment, a torsional spring 28 biases the L-shaped member 14 to bring a retaining hook 19 of retaining member 14 into engagement with the retaining lip 18 of cover 16.

Figures 3, 4:
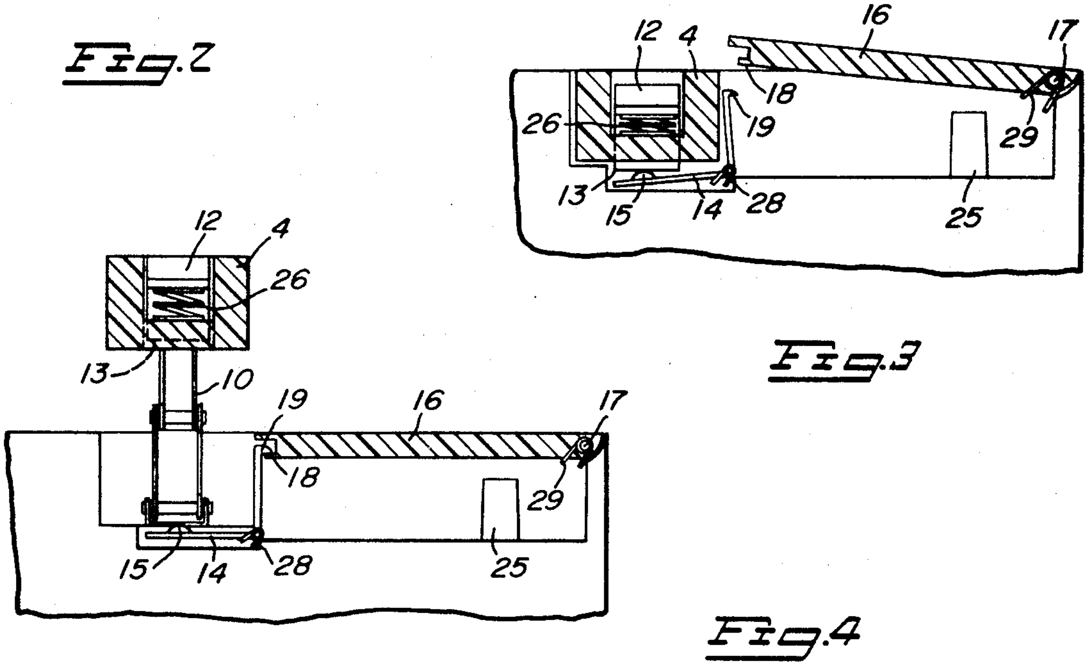
FIG. 3 is a cross-sectional view similar to FIG. 2 showing the pushbutton means depressed and engaging the release mechanism for releasing the cover.
FIG. 4 is a cross-sectional view similar to FIG. 2 showing the carrying handle in an extended position for carrying the cabinet.

Referring to FIG. 3, there is shown a similar cross-sectional diagram to the diagram of FIG. 2. In FIG. 3, the pushbutton member 12 has been depressed against the biasing force of spring 26 to bring a bottom surface 13 of pushbutton 12 into engagement with a protrusion 15 on the horizontal leg of the L-shaped retaining member 14. Pressure applied to pushbutton 12 is transferred to the L-shaped retaining member 14 to cause member 14 to pivot about the intersection of its legs against the biasing force provided by spring 28, thereby bringing retaining hook 19 out of engagement with lip 18 of cover 16. When the cover 16 is released by retaining member 14, a biasing force applied to the cover 16 by a torsional spring 29 causes the cover 16 to pivot about a hinge 17, thereby causing the cover 16 to open partially to allow the edge of the cover 16 to be grasped by the user who wishes to gain access to the controls.

Referring to FIG. 4, there is shown another cross-sectional view along line 2—2 of FIG. 1 showing the handle member 4 in its extended carrying position. In this position, the handle member 4 may be grasped by the user to allow transporting of the cabinet. The cover 16 is shown in its closed position, being engaged by the retaining member 14, as is normally the case when the cabinet is being transported. Note also that when the handle member 4 is in its extended position, the bottom surface 13 of the pushbutton member 12 is physically separated from protrusion 15 of member 14. The physical spacing between the surface 13 and the protrusion 15 when the handle member 4 is in its extended position, together with the interposition of the user's fingers between surface 13 and protrusion 15 when the set is being carried, effectively prevents the retaining member 14 from being activated by the pushbutton member 12 when the cabinet is being carried.

In summary, the techniques and structure of the instant invention provide a convenient means for retaining and releasing an access cover within a wall of an electronic equipment cabinet. The significant features of the instant invention include a reduction in the wall area occupied by the releasing mechanism, additional safety provided by a structure that does not permit release of the cover while the cabinet is being transported and simplicity of construction. It should also be noted that although a particular embodiment of the invention has been illustrated in the foregoing, any embodiment employing the general principles stated herein to provide the features of the instant invention still falls within the scope of the invention.

I claim:

1. In a cabinet for portable electronic equipment having a recessed compartment within one of the walls thereof, and a hinged cover movable to an open position and to a closed position mounted over said recessed compartment to provide access thereto, a handle and cover release mechanism comprising; a carrying handle member movable to an extended carrying position and to a retracted storage position attached to a wall of the cabinet, cover retaining means movable into engagement with said cover to retain said cover in the closed position, and actuating means attached to said handle member and engageable with said cover retaining means to move said cover retaining means out of engagement with said cover to release the latter upon operation of said actuating means only when said handle member is in said retracted position, thereby preventing release of said cover when said handle is in said extended position.

2. A handle and cover release mechanism as recited in claim 1 wherein said handle member is attached to the wall having the recessed compartment therein.

3. A handle and cover release mechanism as recited in claim 1 wherein said actuating means includes a pushbutton member mounted in said handle member for movement from a first normal position to a second depressed position, said pushbutton having an end accessible from a surface of said handle member and another end movable into engagement with said cover retaining means.

4. A handle and cover release mechanism as recited in claim 3 wherein said actuating means includes resilient biasing means for biasing said pushbutton member to said first normal position.

5. A handle and cover release mechanism as recited in claim 4 wherein an outer surface of said handle member is flush with the surface of said wall when said handle member is in said retracted storage position, and wherein said accessible end of said pushbutton is flush with said outer surface of said handle member.

6. A handle and cover release mechanism as recited in claim 1 wherein said cover retaining means includes an L-shaped member pivotally mounted about the intersection of the legs of the L to allow one of said legs to engage said cover when said L-shaped member is pivoted to a first position, and to allow the other leg to be engaged by said actuating means for movement of said L-shaped member to a second position to disengage said one leg from said cover.

7. A handle and cover release mechanism as recited in claim 6 wherein said cover retaining means further includes resilient biasing means for applying a biasing force to said L-shaped member to bias said member to said first position.

8. A cabinet for a portable television receiver including in combination, a recessed compartment mounted within one of the walls of said cabinet, controls mounted within said compartment, a cover movable to an open position and to a closed position mounted over said recessed compartment to provide access to said controls, cover retaining means movable into engagement with said cover to maintain said cover in the closed position, a carrying handle member movable to an extended carrying position and to a retracted storage position attached to a wall of the cabinet, and actuating means attached to said handle member and engageable with said cover retaining means to move said cover retaining means out of engagement with said cover to release the latter upon operation of said actuating means only when said handle member is in said retracted storage position.

9. A cabinet as recited in claim 8 wherein said handle is attached to the top wall of said cabinet.

10. A cabinet as recited in claim 9 wherein said recessed compartment is mounted within the top wall of said cabinet.

11. A cabinet as recited in claim 10 wherein said top wall includes a recessed portion for accepting said handle when said handle is in the retracted storage position.

12. A cabinet as recited in claim 8 wherein said actuating means includes resilient biasing means and a pushbutton member mounted in said handle member for movement against said resilient biasing means from a first normal position to a second depressed position, said pushbutton having an end accessible from a surface of said handle member and another end movable into engagement with said cover retaining means.

13. A cabinet as recited in claim 8 wherein said cover retaining means includes resilient biasing means, and an L-shaped member engaging said biasing means pivotally mounted about the intersection of the legs of the L to allow one of said legs to engage said cover when said L-shaped member is pivoted to a first position, and to allow the other leg to be engaged by said actuating means for movement of said L-shaped member against said resilient biasing means to a second position to disengage said one leg from said cover.

* * * * *